United States Patent
Jung et al.

(10) Patent No.: US 7,316,442 B2
(45) Date of Patent: Jan. 8, 2008

(54) DETACHMENT PREVENTION DEVICE OF SEAT RAIL FOR VEHICLE

(75) Inventors: Jae-Chul Jung, Ulsan-Shi (KR); Masao Nihei, Gyungju-Shi (KR)

(73) Assignee: Das Co., Ltd., Kyungsangbuk-Do (KR)

(*) Notice: Subject to any disclaimer, the term of this patent is extended or adjusted under 35 U.S.C. 154(b) by 94 days.

(21) Appl. No.: 11/002,631

(22) Filed: Dec. 3, 2004

(65) Prior Publication Data
US 2005/0184502 A1  Aug. 25, 2005

(30) Foreign Application Priority Data
Feb. 23, 2004  (KR) .................. 10-2004-0011857

(51) Int. Cl.
*B60N 1/08* (2006.01)
*F16M 13/00* (2006.01)

(52) U.S. Cl. .................. 296/68.1; 296/65.13; 248/430; 297/216.19

(58) Field of Classification Search ............ 296/65.13, 296/65.14, 65.15, 68.1; 248/429, 430; 297/216.19
See application file for complete search history.

(56) References Cited

U.S. PATENT DOCUMENTS 6,422,526 B1 * 7/2002 Ishikawa et al. ............ 248/430
6,860,538 B2 * 3/2005 Muller et al. ............ 296/65.13

* cited by examiner

Primary Examiner—Joseph D. Pape
(74) Attorney, Agent, or Firm—Lowe Hauptman Ham & Berner LLP

(57) ABSTRACT

A detachment prevention device of a seat rail for a vehicle, designed to allow an outer side wall of a lower rail to be extended in the event of a crash and to suppress bent portions from being deformed, thereby ensuring passenger safety. The seat rail comprises a lower rail fixed to a bottom surface of a vehicle body by means of fixing means, an upper rail located on the lower rail and coupled thereto, bent portions formed at both sides of the lower rail and the upper rail, respectively, such that the lower rail is hooked to the upper rail by means of the bent portions, a bracket extended from a center of the upper rail to an upper portion thereof in order to fix a vehicle seat to the upper rail, and a buckle fixed to the bracket to fasten a seat belt.

3 Claims, 5 Drawing Sheets

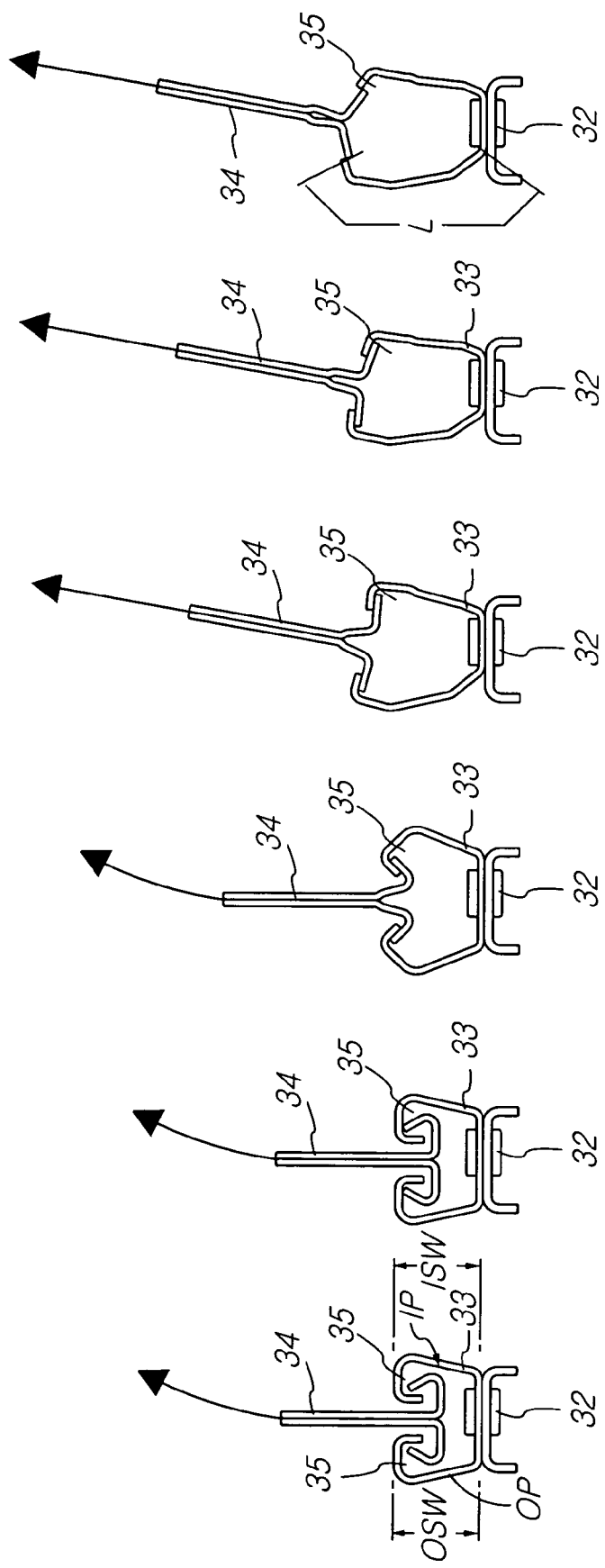

DETACHMENT PREVENTION DEVICE OF SEAT RAIL FOR VEHICLE

BACKGROUND OF THE INVENTION

1. Field of the Invention

The present invention relates to a detachment prevention device of a seat rail for a vehicle, and more particularly, to a detachment prevention device of a seat rail for a vehicle, designed to prevent upper and lower rails constituting the seat rail from being detached from the seat rail by virtue of impact (inertial force) occurring when external force is applied to the seat rail in the event of a crash or the like.

2. Description of the Related Art

Vehicle seats serve to maintain the posture of a passenger in a vehicle, and may be classified into a driver seat, a driver-side passenger seat, and a rear passenger seat.

A seat rail serves to mount the vehicle seat, and has a buckle for fastening a seat belt fixed to one side thereof (an inner surface of the seat rail, and more specifically, the right side of the seat rail in the case of the driver seat, and the left side of the seat rail in the case of the driver-side passenger seat). Accordingly, when a passenger is seated in the vehicle with their seat belts fastened and a sudden stop or a crash occurs, a significant inertial force is applied to the seat rail, thereby causing the vehicle seat to be detached from the seat rail.

In particular, when the passenger is seated in the vehicle with their seat belts fastened, the weight of the passenger is added to the inertial force of the impact, and is then transferred to the seat belt together with the inertial force, so that if the crash occurs in the case where the buckle for fastening the seat belt is fixed to an inner surface of the seat rail, the seat rail is subject to a serious deformation.

With reference to FIGS. 1 and 2, the construction of the seat rail and deformation thereof when a load is applied to the seat rail will be described as follows.

A seat rail 30 for a vehicle generally includes a lower rail 33 fixed to a vehicle body by means of fixing means, such as rivets or bolts, and an upper rail 34 located on the lower rail 33 and coupled thereto.

The lower rail 33 and the upper rail 34 are bent at both ends thereof to form bent portions 35, respectively, such that the lower rail 33 can be hooked to the upper rail by means of the bent portions 35. The upper rail 34 has a bracket 37 extended from the center of the upper rail 34 to an upper portion thereof to fix the seat 36 to the upper rail 34.

The bracket 37 has a buckle 38 fixed thereto for fastening the seat belt.

In such a construction, when an impact force is transferred to the seat rail in the event of a crash or the like, the force is focused more on the inner portion of the seat rail, to which the buckle for fastening the seat belt is fixed, than any other portions of the seat rail, so that the inner portion of the seat rail is deformed and is then detached from the seat rail.

Specifically, among components of the inner portion of the seat rail to which a greater load is applied than any other portions, the upper rail 34 is subject to an upward force and is then lifted together with the seat 36, whereby an outer portion OP of the fixing means 32 for fixing the lower rail 33 is deformed (elongated) at first, and then the bent portions 35 of the upper and lower rails 33 and 34 are deformed.

If the outer portion OP of the lower rail 33 is deformed, an inner portion IP of the lower rail 33 is also deformed, but the deformation of the inner portion IP is not serious, compared with the outer portion OP.

At this time, the first deformation occurs at an outer side wall OSW of the lower rail 33 on the outer portion OP of the lower rail 33, followed by deformation of the bent portions 35. A deformed length of the outer side wall OSW is limited from an end point EP of the fixing means 32 to the bent portion 35 of the lower rail 33, which causes a rapid deformation of the bent portions 35, resulting in detachment of the seat rail.

The detachment of the seat rail as described above can cause the passenger to be ejected out together with the vehicle seat, and causes a secondary impact of the passenger against the interior of the vehicle, such as a window or an instrument panel, thereby causing serious problems, such as aggravation of injury to the passenger and the like.

SUMMARY OF THE INVENTION

The present invention has been made to solve the above problems, and it is an object of the present invention to provide a detachment prevention device of a seat rail for a vehicle, designed to allow an outer side wall of a lower rail of the seat rail to be extended by means of a fixing means for fixing the lower rail to the bottom surface of a vehicle body, and to suppress bent portions of upper and lower rails, which will be deformed in the event of a crash or the like, from being deformed, thereby contributing to passenger safety.

BRIEF DESCRIPTION OF THE DRAWINGS

The foregoing and other objects and features of the present invention will be more clearly understood from the following detailed description taken in conjunction with the accompanying drawings, in which:

FIG. 5 shows a seat rail having the detachment prevention device in accordance with the present invention, in which the seat rail is deformed by virtue of load.

DESCRIPTION OF THE PREFERRED EMBODIMENTS

Preferred embodiments will now be described in detail with reference to the accompanying drawings.

Figure 1:
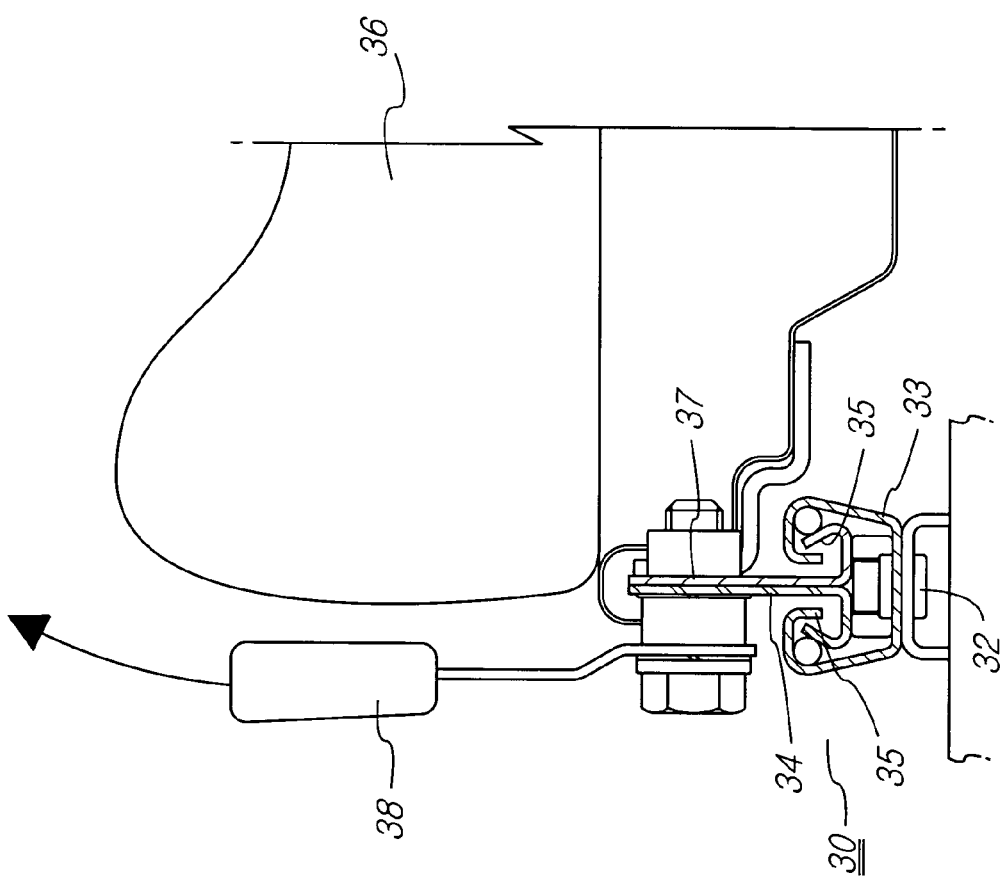
FIG. 1 is a schematic cross-sectional view showing a seat rail for a vehicle in accordance with the present invention, in which a seat is mounted on the seat rail for illustrating the principle of the present invention.
Figure 2:
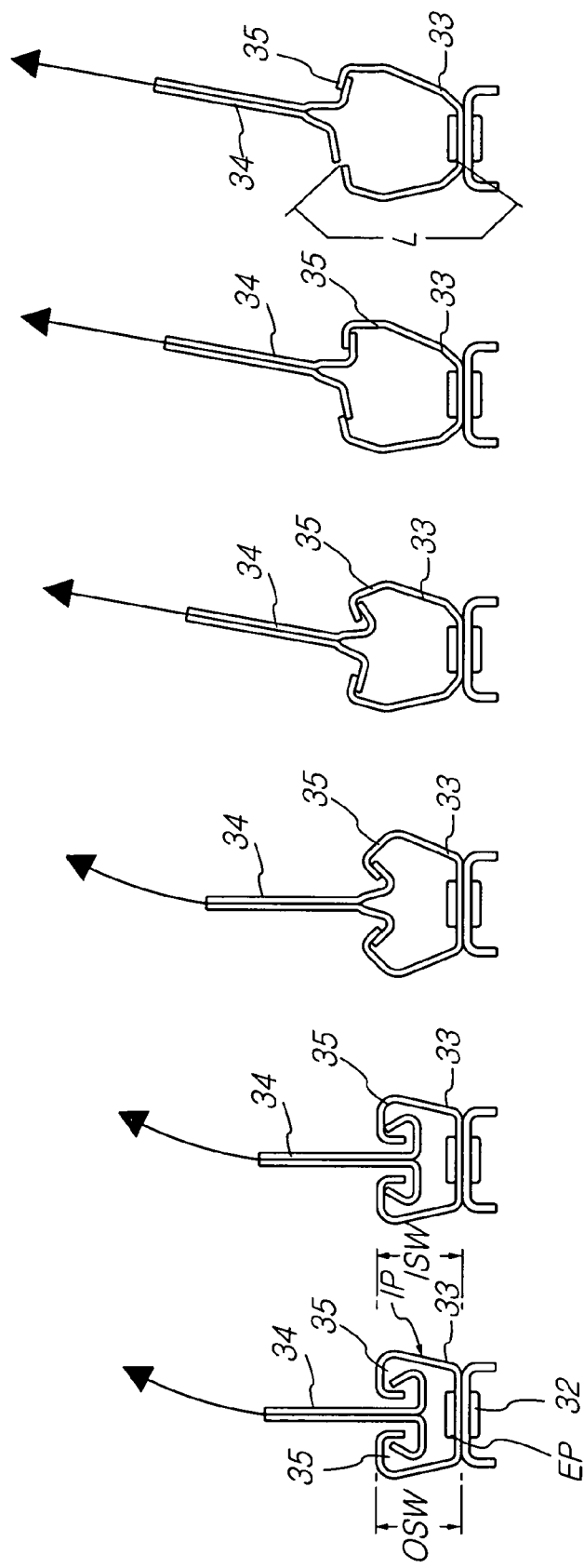
FIG. 2 shows the seat rail deformed by virtue of load for illustrating the principle of the present invention.
Figure 3:
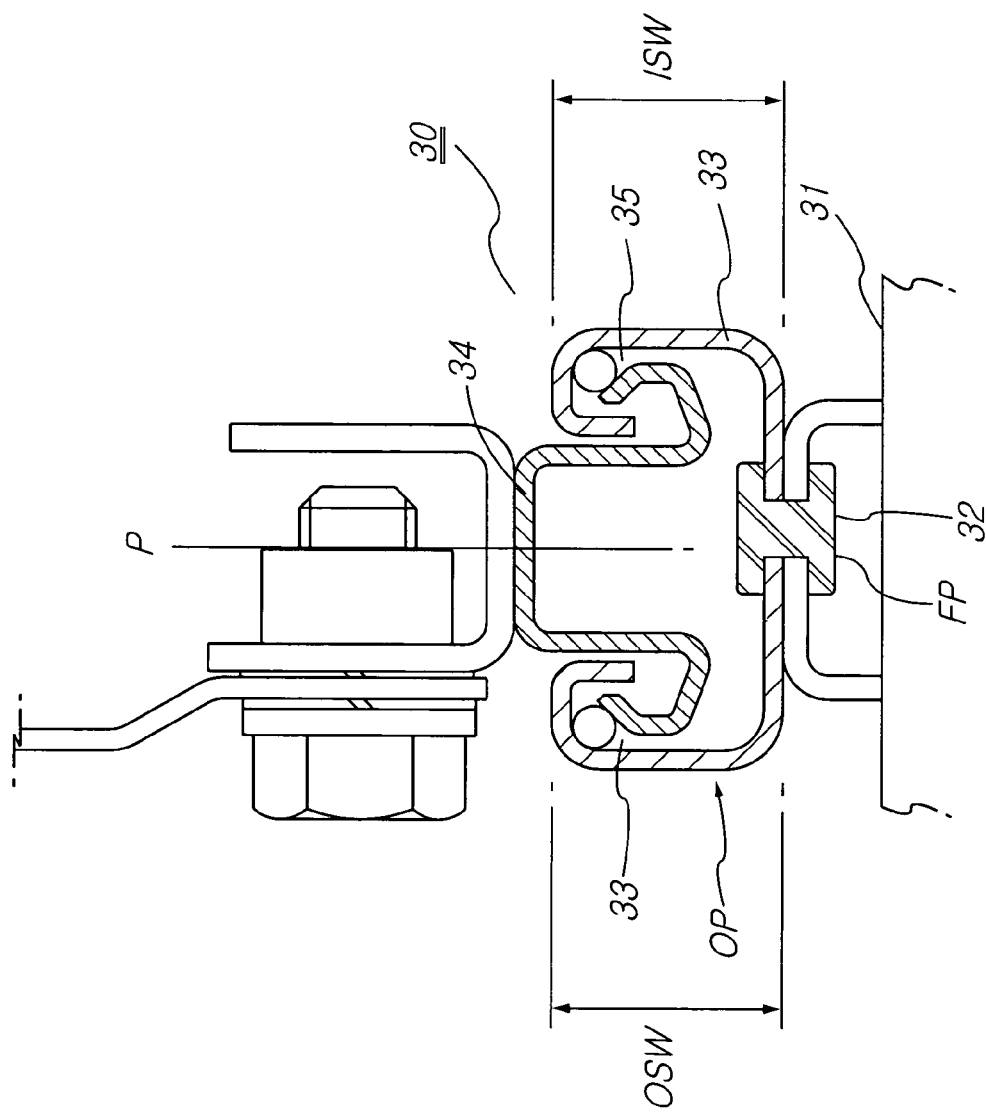
FIG. 3 is a cross-sectional view illustrating a detachment prevention device of the seat rail for a vehicle in accordance with one embodiment of the present invention.
Figure 4:
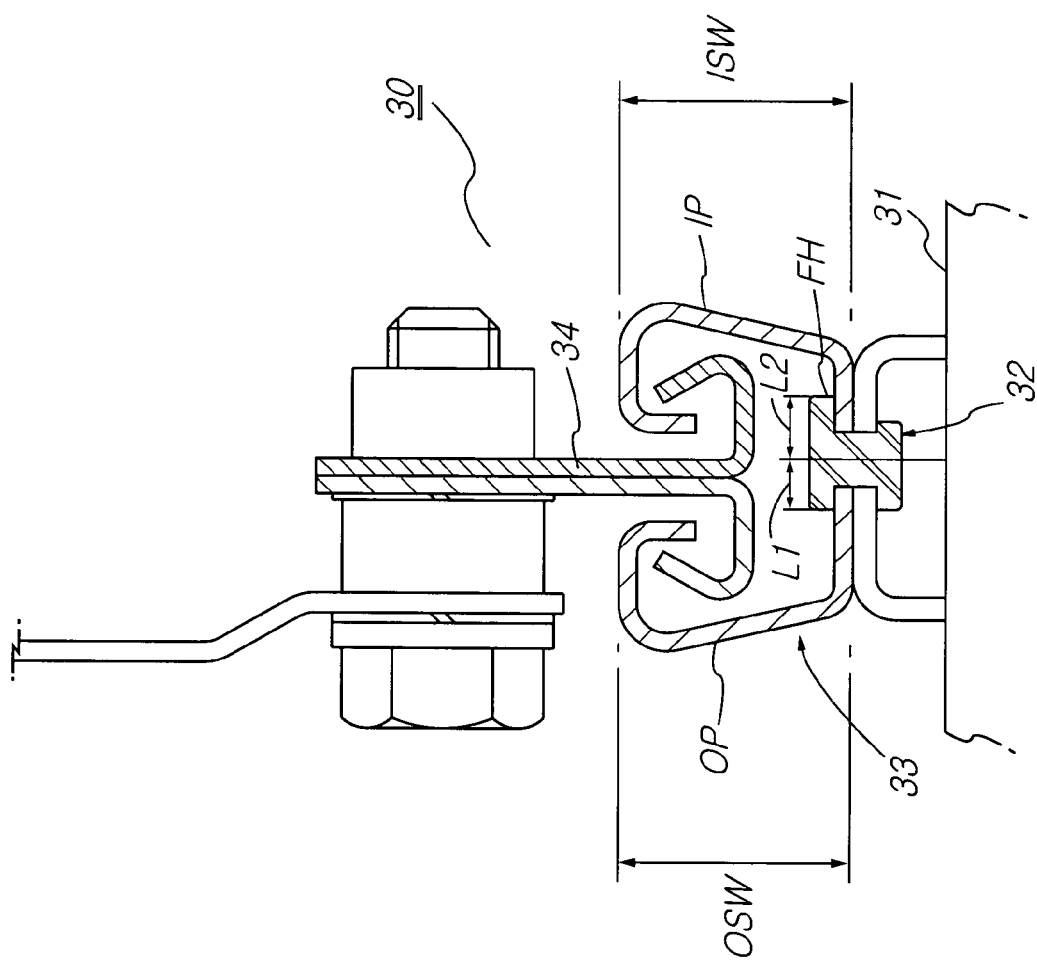
FIG. 4 is a cross-sectional view illustrating a detachment prevention device of the seat rail for the vehicle in accordance with another embodiment of the present invention.

FIG. 3 is a cross-sectional view illustrating a detachment prevention device of a seat rail for a vehicle in accordance with one embodiment of the present invention, FIG. 4 is a cross-sectional view illustrating a detachment prevention device of the seat rail for the vehicle in accordance with another embodiment of the present invention, and FIG. 5 shows a seat rail having the detachment prevention device in accordance with the present invention, in which the seat rail is deformed by virtue of load.

A seat rail 30 for a vehicle generally includes a lower rail 33 fixed to a bottom surface 31 of a vehicle body by means of fixing means 32, such as rivets or bolts, and an upper rail 34 located on the lower rail 33 and coupled thereto.

The lower rail 33 and the upper rail 34 are bent at both ends thereof to form bent portions 35, respectively, such that the lower rail 33 is hooked to the upper rail by means of the bent portions 35. The upper rail 34 has a bracket 37 extended from the center of the upper rail 34 to an upper portion thereof in order to fix the seat 36 to the upper rail 34. The bracket 37 has a buckle 38 fixed thereto for fastening a seat belt.

The present invention is characterized in that, when the seat rail 30 is deformed due to an excessive inertial force applied to the seat 36 and the buckle 38 in the event of a crash or the like, the seat rail 30 is adapted to have a greater degree of deformation L at an outer side wall OSW of an outer portion OP of the lower rail 33, thereby preventing detachment of the seat from the seat rail caused by deformation of the bent portions 35 as much as possible.

For this purpose, according to the present invention, the fixing means 32 for fixing the lower rail 33 to the bottom surface 31 of the vehicle body may be located at a fixing position FP deviated from the center of the seat rail 30.

As can be seen in the drawings, the fixing position FP of the fixing means 32 is located at a position deviated from the center P of the seat rail 30 toward an inner side wall ISW of an inner portion IP, so that the outer side wall OSW of the outer portion OP of the lower rail 33 has a greater degree of deformation L.

At this time, regardless of positions of the seat rail 30, the fixing position FP of the fixing means 32 is located at a position deviated in the direction in which the inertial force is not applied.

A deviation range of the fixing means 32 from the center of the lower rail 33 may be determined to an extent that, with the lower rail 33 fixed to the bottom surface of the vehicle body, normal operation of the seat rail 30 can be ensured.

According to another embodiment of the present invention, instead of changing the fixing position FP of the fixing means, a fixing head FH of the fixing means 23 may be changed in shape, such that the seat rail 30 may have a greater degree of deformation L at the outer side wall OSW of the outer portion OP of the lower rail 33.

In this case, regardless of positions of the seat rail 30, the fixing head FH of the fixing means 32 is shaped such that the fixing head FH is shortened in the direction in which the inertial force is applied, and is elongated in the direction in which the inertial force is not applied.

As can be seen in the drawings, the fixing head FH of the fixing means 32 is shortened to have a length L1 in the direction of the outer side wall OSW of the outer portion OP, and is elongated to have a length L2 in the direction of an inner side wall ISW of the inner portion IP.

As a result, when a passenger is seated in the vehicle with their seat belt fastened, if an inertial force is applied to the seat rail in the event of a crash or the like, the force is applied to the inner portion of the seat rail, to which the buckle 38 is fixed, in the direction of the arrows shown in FIG. 5, causing the lower rail 33 to be deformed.

That is, the outer side wall OSW is deformed first on the outer portion OP of the inside lower rail 33 from the end point EP of the head of the fixing means 32 to the bent portion 35 of the lower rail 33, and if additional inertial force is applied to the seat rail, the bent portions 35 of the seat rail 30 will be also deformed.

In this regard, the fixing means 32 for fixing the lower rail 33 is located at the position deviated from the center P of the seat rail 30 toward the inner side wall ISW of the inner portion IP of the lower rail 33, so that the degree of deformation L is increased corresponding to a deviated amount of the fixing means 32. Accordingly, the bent portions 35 of the seat rail can be prevented from being easily deformed (that is, from being easily stretched) as much as possible, thereby preventing the seat from being detached from the seat rail 30.

That is, the fixing position FP of the fixing means 32 is located at the position deviated from the center P of the seat rail 30 toward the inner side wall ISW of the inner portion IP of the lower rail 33, so that the outer side wall OSW of the outer portion OP of the lower rail 33 has a great degree of deformation L, thereby preventing the bent portions 35 from being easily deformed.

Alternatively, instead of changing the fixing position FP of the fixing means, the fixing head FH of the fixing means 23 may be changed in shape, such that the fixing head FH of the fixing means 32 is shortened to have a length L1 in the direction of the outer side wall OSW of the outer portion OP, and is elongated to have a length L2 in the direction of the inner side wall ISW of the inner portion IP.

According to the present invention constructed as described above, the fixing means is located at the position deviated in the direction in which the inertial force is not applied, or the fixing means is changed in shape such that the fixing head is shortened in the direction of the inertial force while being elongated in the opposite direction. As a result, the outer side wall of the lower rail can be extended in the direction in which the inertial force is applied, and allows a deformational force caused by the crash to be overcome, thereby preventing detachment of the seat from the seat rail, and thus ensuring passenger safety.

As can be appreciated from the above description, the outer side wall of the lower rail can be extended by means of the fixing means for fixing the lower rail to the bottom surface of the vehicle body, and can suppress the bent portions of upper and lower rails, which will be deformed in the event of a crash or the like, from being deformed, thereby contributing to the passenger safety.

It should be understood that the embodiments and the accompanying drawings have been described for illustrative purposes and the present invention is limited by the following claims. Further, those skilled in the art will appreciate that various modifications, additions and substitutions are allowed without departing from the scope and spirit of the invention as set forth in the accompanying claims.

What is claimed is:

1. A detachment prevention device of a seat rail for a vehicle, the seat rail comprising:
   a lower rail fixed to a bottom surface of a vehicle body by a fixing means,
   an upper rail located above the lower rail and coupled thereto;
   bent portions formed at both sides of the lower rail and the upper rail, respectively, such that the lower rail is hooked to the upper rail by means of the bent portions;
   a bracket extended from a center of the upper rail to an upper portion thereof in order to fix a vehicle seat to the upper rail; and
   a buckle fixed to the bracket to fasten a seat belt,
   wherein the detachment prevention device allows an outer side wall of an outer portion of the lower rail to have a greater degree of deformation upon deformation of the seat rail caused by excessive inertial force in the event of a crash to the buckle and the seat rail in order to suppress deformation of the bent portions, thereby preventing the seat from being detached from the seat rail, and the fixing means of the detachment prevention device is positioned at a fixing position deviated from the center of the seat rail in a direction in which the inertial force is not applied.

2. The device as set forth in claim 1, wherein a first portion having length (L1), of a fixing head from a central axis of said fixing means, is shorter than a second portion having length (L2) of the fixing head from the central axis, thereby the first portion having length (L1) which is subjected to the inertial force has a greater degree of deformation.

3. The detachment prevention device according to claim 1, wherein said fixing means is at least one of rivet or bolt.

* * * * *